United States Patent
Vincent et al.

(10) Patent No.: US 12,455,330 B2
(45) Date of Patent: Oct. 28, 2025

(54) ADAPTIVE IMAGE RECEIVE COIL LAYERED AND DUAL-SIDED

(71) Applicant: GE Precision Healthcare LLC, Waukesha, WI (US)

(72) Inventors: Jana Michelle Vincent, Aurora, OH (US); Victor Taracila, Orange Village, OH (US); Barbara Ann Sammut, Beavercreek, OH (US); Fraser John Laing Robb, Aurora, OH (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 153 days.

(21) Appl. No.: 18/406,520

(22) Filed: Jan. 8, 2024

(65) Prior Publication Data
US 2025/0224466 A1 Jul. 10, 2025

(51) Int. Cl.
*G01R 33/34* (2006.01)

(52) U.S. Cl.
CPC . *G01R 33/34084* (2013.01); *G01R 33/34007* (2013.01)

(58) Field of Classification Search
CPC ........ G01R 33/34084; G01R 33/34007; G01R 33/341; G01R 33/3415
See application file for complete search history.

(56) References Cited

U.S. PATENT DOCUMENTS

| | | | |
|---|---|---|---|
| 9,880,238 B2 | 1/2018 | Arias et al. | |
| 11,656,302 B2 | 5/2023 | Rispoli et al. | |
| 2005/0253582 A1* | 11/2005 | Giaquinto | G01R 33/3415 324/318 |
| 2011/0215807 A1* | 9/2011 | Misic | G01R 33/3678 324/322 |
| 2018/0372817 A1* | 12/2018 | Rahmat-Samii | G01R 33/34084 |

OTHER PUBLICATIONS

Rossman et al., "Characterization of a new ulatra-flexible, low profile RF receive coil technology", Proc. Intl. Soc. Mag. Reason. Med. 25, 2017, 3 pgs.
Vincent et al. "Conductive Thread-Based Stretchable and Flexible Radiofrequency Coils for Magnetic Resonance Imaging," IEEE Trans Biomed Eng, Aug. 1, 2021, 26 pgs.
U.S. Appl. No. 18/406,529, filed Jan. 8, 2024, Vincent.

* cited by examiner

*Primary Examiner* — G. M. A Hyder
(74) *Attorney, Agent, or Firm* — Fletcher Yoder, P.C.

(57) ABSTRACT

An RF receiving coil assembly for an MRI system includes a flexible enclosure. The radio frequency receiving coil assembly also includes a radio frequency coil disposed within the flexible enclosure. The radio frequency coil includes a plurality of flexible coil elements having a bare malleable or stretchable conductor. The plurality of flexible coil elements includes a first set of flexible coil elements and a second set of flexible coil elements. At least one flexible coil element of the first set of flexible coil elements overlaps with at least one flexible coil element of the second set of flexible coil elements without respective bare malleable or stretchable conductors directly contacting each other.

20 Claims, 7 Drawing Sheets

Coil Layout

Side 1

Side 2

Coil Layout

Layer 1

Layer 2

Layer 3

Layer 4

ADAPTIVE IMAGE RECEIVE COIL LAYERED AND DUAL-SIDED

BACKGROUND

The subject matter disclosed herein relates to medical imaging and, more particularly, to an adaptive image receive coil layered and dual sided for a magnetic resonance imaging (MRI) system.

Non-invasive imaging technologies allow images of the internal structures or features of a patient/object to be obtained without performing an invasive procedure on the patient/object. In particular, such non-invasive imaging technologies rely on various physical principles (such as the differential transmission of X-rays through a target volume, the reflection of acoustic waves within the volume, the paramagnetic properties of different tissues and materials within the volume, the breakdown of targeted radionuclides within the body, and so forth) to acquire data and to construct images or otherwise represent the observed internal features of the patient/object.

During magnetic resonance imaging, when a substance such as human tissue is subjected to a uniform magnetic field (polarizing field $B_0$), the individual magnetic moments of the spins in the tissue attempt to align with this polarizing field, but precess about it in random order at their characteristic Larmor frequency. If the substance, or tissue, is subjected to a magnetic field (excitation field $B_1$) which is in the x-y plane and which is near the Larmor frequency, the net aligned moment, or "longitudinal magnetization", $M_z$, may be rotated, or "tipped", into the x-y plane to produce a net transverse magnetic moment, $M_t$. A signal is emitted by the excited spins after the excitation signal $B_1$ is terminated and this signal may be received and processed to form an image.

When utilizing these signals to produce images, magnetic field gradients ($G_x$, $G_y$, and $G_z$) are employed. Typically, the region to be imaged is scanned by a sequence of measurement cycles in which these gradient fields vary according to the particular localization method being used. The resulting set of received nuclear magnetic resonance (NMR) signals are digitized and processed to reconstruct the image using one of many well-known reconstruction techniques.

Utilization of exposed conductive traces in a coil array can lead to shorting due to overlap of adjacent coil elements. Thus, conventional coil arrays stray away from bare conductors or employ a form of insulation (e.g., conductor jacket or spacing between printed circuit board traces). In addition, conventional coil arrays are limited with regard to the type of conductors utilized for the coil elements. This also leads to the manufacturing of the conventional coil arrays being both more complicated and time consuming. Further, the conventional coil arrays cost more and weigh more.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a radio frequency (RF) receiving coil assembly for a magnetic resonance imaging (MRI) system is provided. The radio frequency receiving coil assembly includes a flexible enclosure. The radio frequency receiving coil assembly also includes a radio frequency coil disposed within the flexible enclosure. The radio frequency coil includes a plurality of flexible coil elements having a bare malleable or stretchable conductor. The plurality of flexible coil elements includes a first set of flexible coil elements and a second set of flexible coil elements. At least one flexible coil element of the first set of flexible coil elements overlaps with at least one flexible coil element of the second set of flexible coil elements without respective bare or stretchable malleable conductors directly contacting each other.

In another embodiment, a radio frequency (RF) receiving coil assembly for a magnetic resonance imaging (MRI) system is provided. The radio frequency receiving coil assembly includes a flexible enclosure. The radio frequency receiving coil also includes a flexible anchoring material layer disposed within the flexible enclosure. The radio frequency receiving coil assembly further includes a radio frequency coil disposed within the flexible enclosure, wherein the radio frequency coil includes a plurality of flexible coil elements having a malleable or stretchable conductor. The plurality of flexible coil elements includes a first set of flexible coil elements and a second set of flexible coil elements. The first set of flexible coil elements is disposed on a first side of the flexible anchoring material layer and the second set of flexible coil elements is disposed on a second side of the flexible anchoring material layer opposite the first side. At least one flexible coil element of the first set of flexible coil elements overlaps with at least one flexible coil element of the second set of flexible coil elements In a further embodiment, a radio frequency (RF) receiving coil assembly for a magnetic resonance imaging (MRI) system is provided. The radio frequency receiving coil assembly includes a flexible enclosure. The radio frequency receiving coil also includes a first flexible anchoring material layer disposed within the flexible enclosure and having a first side and a second side. The radio frequency receiving coil further includes a second flexible anchoring material layer disposed within the flexible enclosure and having a third side and a fourth side. The radio frequency receiving coil assembly even further includes a radio frequency coil disposed within the flexible enclosure, wherein the radio frequency coil includes a plurality of flexible coil elements having a malleable or stretchable conductor. The plurality of flexible coil elements includes a first set of flexible coil elements and a second set of flexible coil elements. The first set of flexible coil elements is disposed on the first side of the first flexible anchoring material layer and the second set of flexible coil elements is disposed on the third side of the second flexible anchoring material layer. The first flexible anchoring material layer is disposed over the second flexible anchoring material layer within the flexible enclosure in a stacked arrangement so that the third side of the second flexible anchoring material layer interfaces with the second side of the first flexible anchoring material layer. At least one flexible coil element of the first set of flexible coil elements overlaps with at least one flexible coil element of the second set of flexible coil elements.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
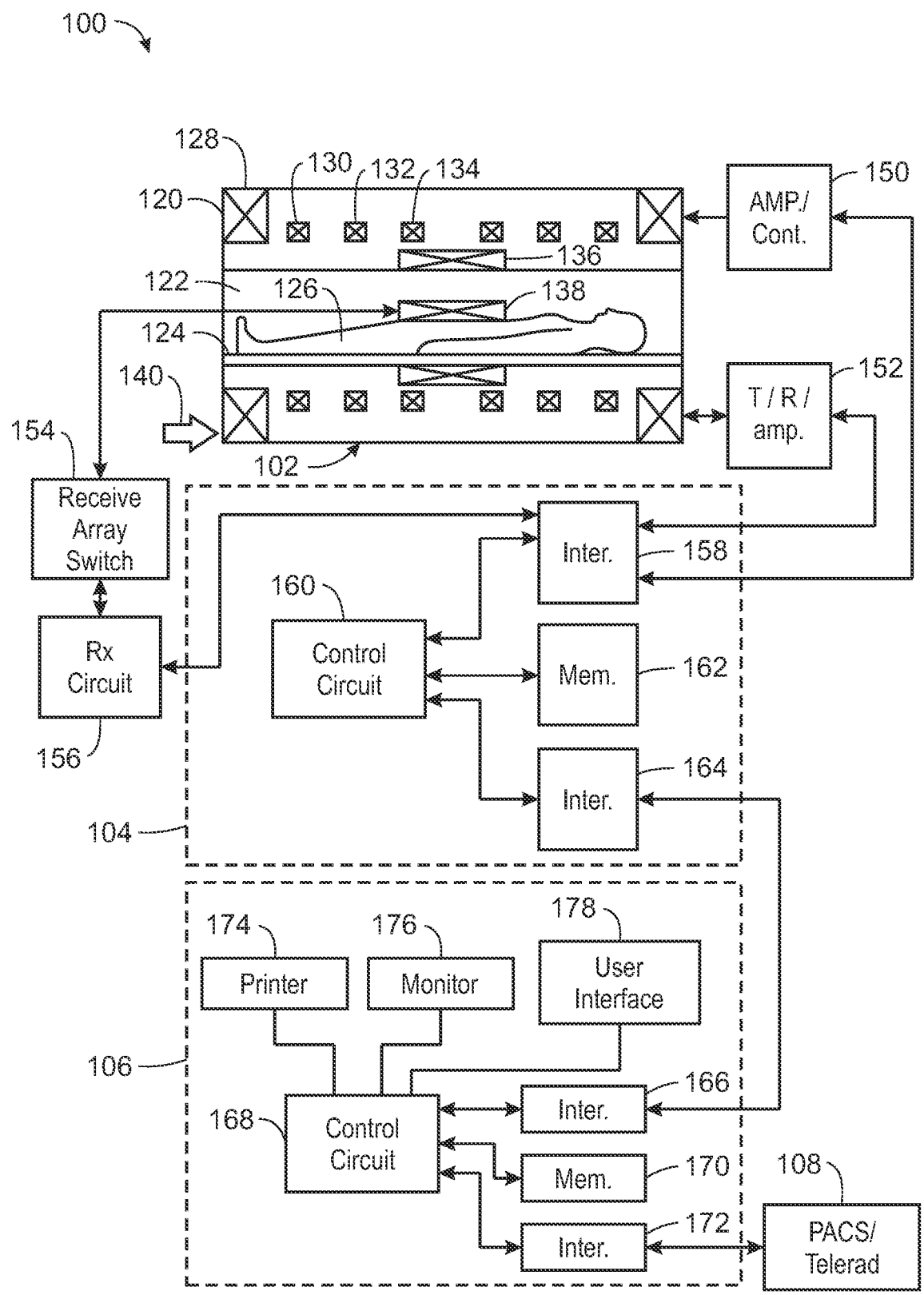
FIG. 1 illustrates an embodiment of a magnetic resonance imaging (MRI) system suitable for use with the disclosed technique.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing coil elements of various embodiments of the present subject matter, the articles "a," "an," "the," and "said" are intended to mean that there are one or more of the coil elements. The terms "comprising," "including," and "having" are intended to be inclusive and mean that there may be additional coil elements other than the listed coil elements. Furthermore, any numerical examples in the following discussion are intended to be non-limiting, and thus additional numerical values, ranges, and percentages are within the scope of the disclosed embodiments.

The present disclosure provides for an adaptive image receive coil layered and dual sided for a magnetic resonance imaging (MRI) system. In particular, the present disclosure provides for a radio frequency coil assembly (e.g., body coil) of a magnetic resonance imaging system having coil elements (e.g., channel or loops) arranged in layered and/or dual sided arrangement with respect to each other. Although discussed in the context of a body coil, the disclosed embodiments can be utilized with respect to magnetic resonance compatible sensors. Although discussed in the context of a body coil utilized with a magnetic resonance imaging system, the coil can be utilized in multi-nuclear applications (e.g., with positron emission tomography (PET)/magnetic resonance imaging system).

The disclosed embodiments include a radio frequency (RF) receiving coil assembly for a magnetic resonance imaging (MRI) system that includes a flexible enclosure. The radio frequency receiving coil assembly also includes a radio frequency coil disposed within the flexible enclosure. The radio frequency coil includes a plurality of flexible coil elements having a malleable or stretchable conductor. In certain embodiments, the malleable or stretchable conductor is bare or unshielded. In certain embodiments, the malleable conductor may be a shield conductor. The plurality of flexible coil elements includes a first set of flexible coil elements and a second set of flexible coil elements. At least one flexible coil element of the first set of flexible coil elements overlaps with at least one flexible coil element of the second set of flexible coil elements without respective malleable or stretchable conductors directly contacting each other. In certain embodiments (e.g., with bare malleable or stretchable conductors, at least one flexible coil element of the first set of flexible coil elements overlaps with at least one flexible coil element of the second set of flexible coil elements without respective bare malleable or stretchable conductors directly contacting each other at any points of overlap.

In certain embodiments, each flexible coil element of the first set of flexible coil elements overlaps with at least two flexible coil elements of the second set of flexible coil elements. In certain embodiments, each flexible coil element of the first set of flexible coil elements overlaps with at least two flexible coil elements of the second set of flexible coil elements without the malleable or stretchable conductors directly contacting each other. In certain embodiments, each flexible coil element of the first set of flexible coil elements overlaps with at least two flexible coil elements of the second set of flexible coil elements without the respective bare malleable or stretchable conductors directly contacting each other at any points of overlap.

In certain embodiments, in a dual-sided arrangement, different sets of flexible coil elements may be disposed on alternating sides (e.g., opposite sides) of an anchoring material so that every other flexible coil element (of one set of flexible coil elements) is on one side, and the other flexible coil elements in between (of another set of flexible coil elements) are coupled on the opposite side in an overlapping arrangement (with respect to other set of flexible coil elements) forming the coil array while keeping the flexible coil elements of the different sets of flexible coil elements that overlap from touching. In certain embodiments, in a multi-layered arrangement, the overlap of alternating coil elements may occur via different sets of flexible coil elements disposed on different (and multiple) layers of anchoring material. This embodiment may be advantageous in scenarios where more heat dissipating material is needed and can be utilized for the anchoring material layers. In either the dual-sided arrangement or the multi-layered arrangement, an optimal number of overlaps between the flexible coil elements of the different sets of coil elements is achieved. In certain embodiments, a combination of the dual-sided arrangement and the multi-layered arrangement may be utilized.

In certain embodiments, a radio frequency receiving coil assembly includes a flexible anchoring material layer disposed within the flexible enclosure. The first set of flexible coil elements is disposed on a first side of the flexible anchoring material layer and the second set of flexible coil elements is disposed on a second side of the flexible anchoring material layer opposite the first side. In certain embodiments, the flexible anchoring material layer is stretchable. In certain embodiments, the flexible anchoring material layer is made of a heat dissipating material. In certain embodiments, the flexible anchoring material layer is magnetic resonance compatible and does not generate a proton signal. In certain embodiments, the flexible anchoring material layer is made of a film (e.g., plastic film). In certain embodiments, the flexible anchoring material layer is made of a fabric.

In certain embodiments, a radio frequency receiving coil assembly includes a first flexible anchoring material layer having a first side and a second side opposite the first side, and a second flexible anchoring material layer having a third side and a fourth side opposite the third side. The first set of flexible coil elements is disposed on the first side of the first flexible anchoring material layer and the second set of flexible coil elements is disposed on the third side of the second flexible anchoring material layer. Also, the first flexible anchoring layer is disposed over the second flexible anchoring layer within the flexible enclosure in a stacked arrangement so that the third side of the second flexible anchoring layer interfaces with the second side of the first flexible anchoring layer.

In certain embodiments, the radio frequency receiving coil assembly also includes a third flexible anchoring material layer, wherein the plurality of flexible coil elements includes a third set of flexible coil elements and a fourth set of flexible coil elements. The third set of flexible coil elements is disposed on a fifth side of the flexible anchoring material layer and the fourth set of flexible coil elements is disposed on a sixth side of the flexible anchoring material layer opposite the fifth side. Both the first flexible anchoring layer and the second anchoring layer are disposed over the third anchoring layer within the flexible enclosure in the stacked arrangement so that the fifth side of the third flexible anchoring layer interfaces with the fourth side of the second flexible anchoring layer. At least one flexible coil element of the third set of flexible coil elements overlaps with at least one flexible coil element of the fourth set of flexible coil elements without the respective malleable or stretchable conductors directly contacting each other. In certain embodiments, at least one flexible coil element of the third set of flexible coil elements overlaps with at least one flexible coil element of the fourth set of flexible coil elements without the respective malleable or stretchable conductors directly contacting each other. In certain embodiments, at least one flexible coil element of the third set of flexible coil elements overlaps with at least one flexible coil element of the fourth set of flexible coil elements without the respective bare malleable or stretchable conductors directly contacting each other at any points of overlap. In certain embodiments, wherein at least one flexible coil element of both the third set of flexible coil elements and fourth set of flexible coil elements overlaps with at least one flexible coil element of both the first set of flexible coil elements and the second set of flexible coil elements without the respective malleable or stretchable conductors directly contacting each other. In certain embodiments, wherein at least one flexible coil element of both the third set of flexible coil elements and fourth set of flexible coil elements overlaps with at least one flexible coil element of both the first set of flexible coil elements and the second set of flexible coil elements without the respective bare or stretchable malleable conductors directly contacting each other at any points of overlap.

In certain embodiments, the radio frequency receiving coil assembly includes a third flexible anchoring material layer having a fifth side and a sixth side opposite the fifth side, wherein the plurality of flexible coil element includes a third set of flexible coil elements. The third set of flexible coil elements is disposed on the fifth side of the third flexible anchoring material layer. The third flexible anchoring layer is disposed over the first flexible anchoring layer within the flexible enclosure in the stacked arrangement so that the first side of the first flexible anchoring layer interfaces with the sixth side of the third flexible anchoring layer. At least one flexible coil element of the third set of flexible coil elements overlaps with at least one flexible coil element of both the first set of flexible coil elements and the second set of flexible coil elements without the respective malleable or stretchable conductors contacting each other. In certain embodiments, at least one flexible coil element of the third set of flexible coil elements overlaps with at least one flexible coil element of both the first set of flexible coil elements and the second set of flexible coil elements without the respective bare malleable or stretchable conductors contacting each other at any points of overlap.

In certain embodiments, the radio frequency receiving coil assembly also includes a fourth flexible anchoring material layer having a seventh side and a eighth side opposite the seventh side, wherein the plurality of flexible coil element includes a fourth set of flexible coil elements. The fourth set of flexible coil elements is disposed on the seventh side of the fourth flexible anchoring material layer. The fourth flexible anchoring layer is disposed over the third flexible anchoring layer within the flexible enclosure in the stacked arrangement so that the fifth side of the third flexible anchoring layer interfaces with the eighth side of the fourth flexible anchoring layer. The at least one flexible coil element of the fourth set of flexible coil elements overlaps with at least one flexible coil element of each of the first set of flexible coil elements, the second set of flexible coil elements, and the third set of flexible coil elements without the respective malleable or stretchable conductors contacting each other. In certain embodiments, the at least one flexible coil element of the fourth set of flexible coil elements overlaps with at least one flexible coil element of each of the first set of flexible coil elements, the second set of flexible coil elements, and the third set of flexible coil elements without the respective bare or stretchable malleable conductors contacting each other at any points of overlap.

In certain embodiments, the first, second, third, and/or fourth flexible anchoring material layers are stretchable. In certain embodiments, the first, second, third, and/or fourth flexible anchoring material layers are made of a heat dissipating material. In certain embodiments, the first, second, third, and/or fourth flexible anchoring material layers are magnetic resonance compatible and do not generate a proton signal. In certain embodiments, the first, second, third, and/or fourth flexible anchoring material layers are made of a film (e.g., plastic film). In certain embodiments, the first, second, third, and/or fourth flexible anchoring material layers are made of a fabric.

In certain embodiments, the radio frequency receiving coil assembly includes a single-tuned coil (e.g., a single-proton frequency coil). In certain embodiments, the radio frequency receiving coil includes a multi-tuned coil (e.g., multi-nuclear coil) were each frequency is transparent to each other in overlap. For example, a first set of flexible coils on one side of a material (e.g., anchoring material) could be tuned to a first frequency (e.g., for hydrogen) and a second set of flexible coils on the opposite side of the material or on a different layer of material could be tuned to a second frequency (e.g., for carbon-13 or multi-nuclear spectroscopy (MNS)) different from the first frequency.

In certain embodiments (e.g., with flexible coil elements with bare malleable or stretchable conductors), the bare malleable or stretchable core of each flexible coil element of the plurality of flexible coil elements may be Litz wire, wire bundles, tinsel wire bundle, plated filament bundle, woven filament bundle, or a conductive thread bundle. In certain embodiments, the shape of the flexible coil elements may vary and can be any shape (e.g., elliptical, circular, square, rectangular, etc.). In certain embodiments, the flexible coil element may follow a straight path along the shape. In certain embodiments, the flexible coil element may meander (e.g., zig-zag) along the shape. In certain embodiments, the meandering enable the flexible coil element to be stretchable.

The disclosed embodiments enable the utilization of conductors (e.g., bare conductors) without a conductive shield or covering. The disclosed embodiments enable the overlap of bare conductors without touching each other at points of overlap, thus, avoiding any potential shorts. The disclosed embodiments expand the number of techniques that may be utilized in construction of the coil. The disclosed embodiments enable for a coil assembly that is both lighter and more flexible, thus, enhancing patient comfort as well enabling easier positioning of the coil assembly. The disclosed embodiments enable for the manufacturing of coil in a simpler manner (and thus quicker manner) and at reduced cost.

With the preceding in mind, FIG. 1 a magnetic resonance imaging (MRI) system 100 is illustrated schematically as including a scanner 102, scanner control circuitry 104, and system control circuitry 106. According to the embodiments described herein, the magnetic resonance imaging system 100 is generally configured to perform MR imaging.

System 100 additionally includes remote access and storage systems or devices such as picture archiving and communication systems (PACS) 108, or other devices such as teleradiology equipment so that data acquired by the system 100 may be accessed on- or off-site. In this way, MR data may be acquired, followed by on- or off-site processing and evaluation. While the magnetic resonance imaging system 100 may include any suitable scanner or detector, in the illustrated embodiment, the system 100 includes a full body scanner 102 having a housing 120 through which a bore 122 is formed. A table 124 is moveable into the bore 122 to permit a patient 126 to be positioned therein for imaging selected anatomy within the patient.

Scanner 102 includes a series of associated coils for producing controlled magnetic fields for exciting the gyromagnetic material within the anatomy of the subject being imaged. Specifically, a primary magnet coil 128 is provided for generating a primary magnetic field, $B_0$, which is generally aligned with the bore 122. A series of gradient coils 130, 132, and 134 permit controlled magnetic gradient fields to be generated for positional encoding of certain gyromagnetic nuclei within the patient 126 during examination sequences. A radio frequency (RF) coil 136 (e.g., radio frequency transmit coil) is configured to generate radio frequency pulses for exciting the certain gyromagnetic nuclei within the patient. In addition to the coils that may be local to the scanner 102, the system 100 also includes a set of receiving coils or radio frequency receiving coils 138 (e.g., an array of coils) configured for placement proximal (e.g., against) to the patient 126. As an example, the receiving coils 138 can include cervical/thoracic/lumbar (CTL) coils, head coils, single-sided spine coils, and so forth. Generally, the receiving coils 138 are placed close to or on top of the patient 126 so as to receive the weak radio frequency signals (weak relative to the transmitted pulses generated by the scanner coils) that are generated by certain gyromagnetic nuclei within the patient 126 as they return to their relaxed state.

The various coils of system 100 are controlled by external circuitry to generate the desired field and pulses, and to read emissions from the gyromagnetic material in a controlled manner. In the illustrated embodiment, a main power supply 140 provides power to the primary field coil 128 to generate the primary magnetic field, Bo. A power input (e.g., power from a utility or grid), a power distribution unit (PDU), a power supply (PS), and a driver circuit 150 may together provide power to pulse the gradient field coils 130, 132, and 134. The driver circuit 150 may include amplification and control circuitry for supplying current to the coils as defined by digitized pulse sequences output by the scanner control circuitry 104.

Another control circuit 152 is provided for regulating operation of the radio frequency coil 136. Circuit 152 includes a switching device for alternating between the active and inactive modes of operation, wherein the radio frequency coil 136 transmits and does not transmit signals, respectively. Circuit 152 also includes amplification circuitry configured to generate the radio frequency pulses. Similarly, the receiving coils 138 are connected to switch 154, which is capable of switching the receiving coils 138 between receiving and non-receiving modes. Thus, the receiving coils 138 resonate with the radio frequency signals produced by relaxing gyromagnetic nuclei from within the patient 126 while in the receiving mode, and they do not resonate with radio frequency energy from the transmitting coils (i.e., coil 136) so as to prevent undesirable operation while in the non-receiving mode. Additionally, a receiving circuit 156 is configured to receive the data detected by the receiving coils 138 and may include one or more multiplexing and/or amplification circuits.

It should be noted that while the scanner 102 and the control/amplification circuitry described above are illustrated as being coupled by a single line, many such lines may be present in an actual instantiation. For example, separate lines may be used for control, data communication, power transmission, and so on. Further, suitable hardware may be disposed along each type of line for the proper handling of the data and current/voltage. Indeed, various filters, digitizers, and processors may be disposed between the scanner and either or both of the scanner and system control circuitry 104, 106.

As illustrated, scanner control circuitry 104 includes an interface circuit 158, which outputs signals for driving the gradient field coils and the radio frequency coil and for receiving the data representative of the magnetic resonance signals produced in examination sequences. The interface circuit 158 is coupled to a control and analysis circuit 160. The control and analysis circuit 160 executes the commands for driving the circuit 150 and circuit 152 based on defined protocols selected via system control circuit 106.

Control and analysis circuit 160 also serves to receive the magnetic resonance signals and performs subsequent processing before transmitting the data to system control circuit 106. Scanner control circuit 104 also includes one or more memory circuits 162, which store configuration parameters, pulse sequence descriptions, examination results, and so forth, during operation.

Interface circuit 164 is coupled to the control and analysis circuit 160 for exchanging data between scanner control circuitry 104 and system control circuitry 106. In certain embodiments, the control and analysis circuit 160, while illustrated as a single unit, may include one or more hardware devices. The system control circuit 106 includes an interface circuit 166, which receives data from the scanner control circuitry 104 and transmits data and commands back to the scanner control circuitry 104. The control and analysis circuit 168 may include a CPU in a multi-purpose or application specific computer or workstation. Control and analysis circuit 168 is coupled to a memory circuit 170 to store programming code for operation of the magnetic resonance imaging system 100 and to store the processed image data for later reconstruction, display and transmission. The programming code may execute one or more algorithms that, when executed by a processor, are configured to perform reconstruction of acquired data as described below. In certain embodiments, the memory circuit 170 may store one or more neural networks for reconstruction of acquired data as described below. In certain embodiments, image reconstruction may occur on a separate computing device having processing circuitry and memory circuitry.

An additional interface circuit 172 may be provided for exchanging image data, configuration parameters, and so forth with external system components such as remote access and storage devices 108. Finally, the system control and analysis circuit 168 may be communicatively coupled to various peripheral devices for facilitating operator interface and for producing hard copies of the reconstructed images. In the illustrated embodiment, these peripherals include a printer 174, a monitor 176, and user interface 178 including devices such as a keyboard, a mouse, a touchscreen (e.g., integrated with the monitor 176), and so forth.

Figure 2:
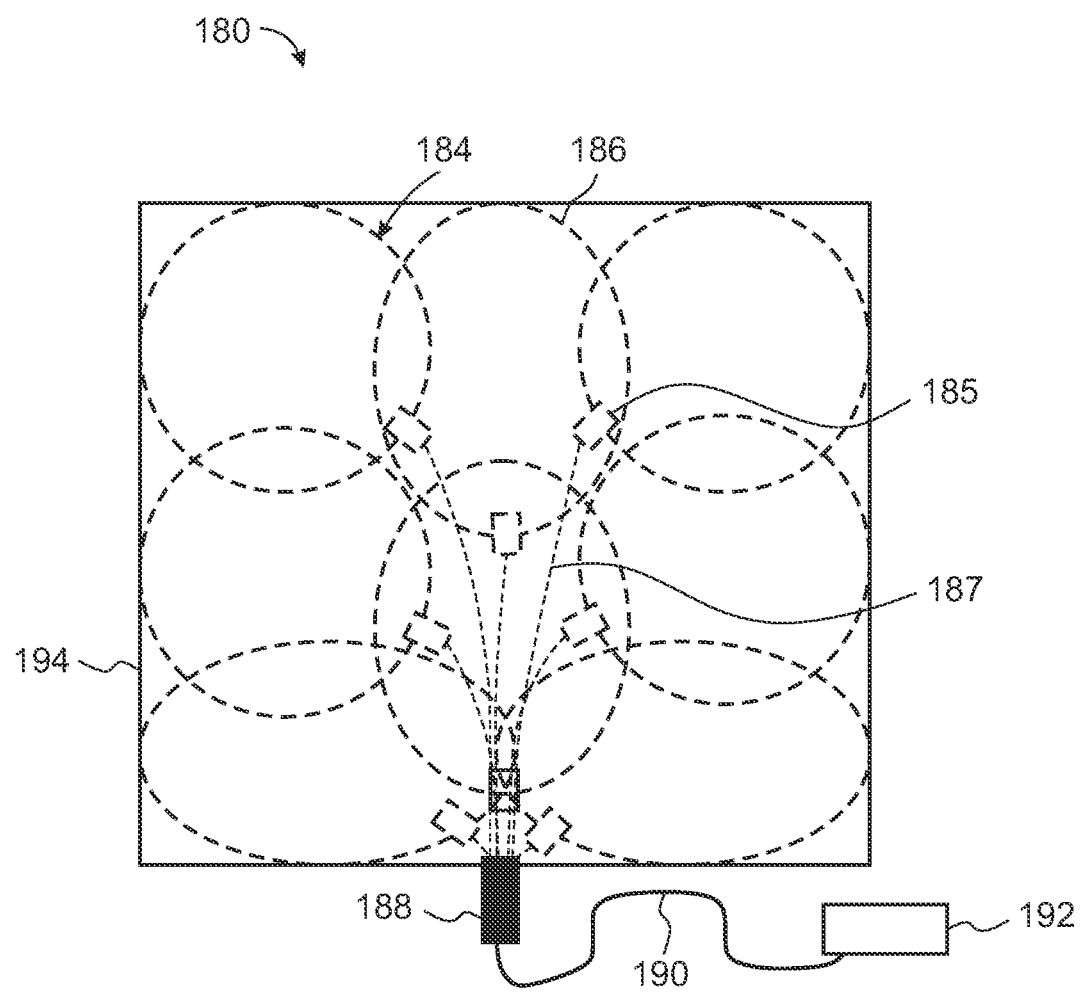
FIG. 2 is a schematic diagram of a radio frequency (RF) coil assembly having a layered and/or dual-sided arrangement for coil elements, in accordance with aspects of the present disclosure.

FIG. 2 is a schematic diagram of a radio frequency coil assembly 180 (e.g., radio frequency receiving coil assembly) having a layered and/or dual-sided arrangement for coil elements. The radio frequency coil assembly 180 may be utilized in an magnetic resonance imaging system (e.g., magnetic resonance imaging system 100 in FIG. 1). The radio frequency coil assembly 180 includes an radio frequency coil 184 having a plurality of coil elements 186 (e.g., loops or channels). Each element 186 is coupled to an electronics unit 185 coupled to a coil-interfacing cable 187. The coil-interfacing cables 187 of each of the coil elements 186 is coupled to an electrical connector interface or interface circuitry 188 (e.g., a balun such as integrated balun cable harness which may act as an radio frequency trap). The electrical connector interface 188 is coupled (via a cable 190) to a P connector 192 (e.g., port connector) that enables the radio frequency coil assembly 180 to be coupled (e.g., via wired connection) to the interface of the magnetic resonance imaging system that couples imaging components to processing components. In certain embodiments, the radio frequency coil assembly 180 may lack a wired connection and may be configured to be utilized wirelessly (e.g., for coupling imaging components to wireless components) with the magnetic resonance imaging system during an magnetic resonance imaging scan.

Each element 186 may consist of linked resonator coil elements coupled to a printed circuit board module (e.g., the electronics unit 185). Each electronics unit 185 may include various components (e.g., a decoupling circuit, an impedance inverter circuit, and a pre-amplifier). The radio frequency coil 184 may be designed utilizing AIR™ coil technology from General Electric Healthcare. This enables the radio frequency coil 184 to be lightweight and flexible. Each element 186 includes a malleable (e.g., flexible) or conductor that enables complex and irregular surface contours. In certain embodiments, each element 186 may stretch (e.g., due to a liquid metal conductor, stretchable/elastic conductor, or meandering structure). In addition, the coil elements 186 of the radio frequency coil 184 are transparent, thus, aiding signal-to-noise ratios.

The radio frequency coil 184 is disposed within a flexible enclosure 194 (e.g., blanket). As depicted, the flexible enclosure 194 has a rectangular shape. In certain embodiments, the flexible enclosure 194 may have a square shape or other shape. In certain embodiments, the flexible enclosure 194 includes holes or openings to increase a flexibility of the radio frequency coil assembly 180 (and the flexible enclosure 194). Each hole or opening may be radially located within the element 186. In certain embodiments, the flexible enclosure 194 may include deformable material within. The deformable material may include foam, memory foam, expanded foam, polyurethane foam, gels such as hydrogel, cells of water, or other suitable deformable material. When the subject lies on the radio frequency coil assembly 180, the subject will sink into the deformable material and the radio frequency coil 184 may conform to the subject's unique shape and, thus, be right up against the patient's body. As depicted, the interface circuitry 188 is disposed within the flexible enclosure 194. In certain embodiments, the interface circuitry 188 may be disposed outside the flexible enclosure 194.

Figure 3:
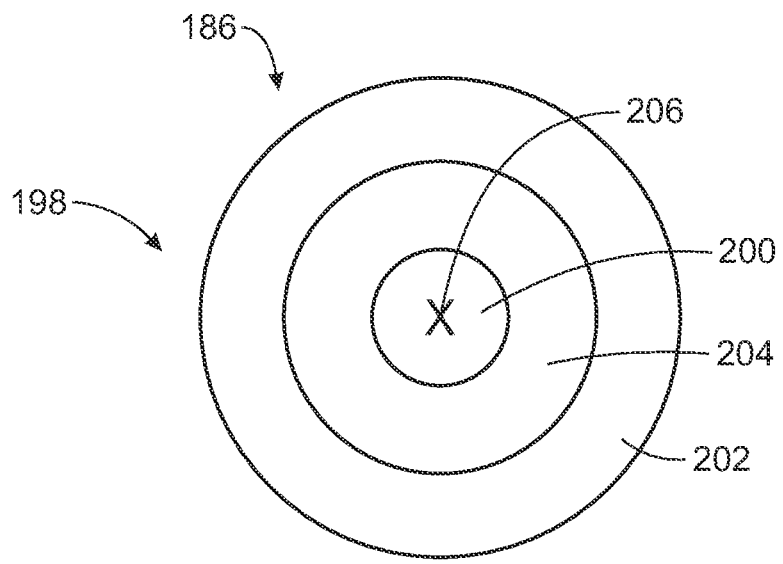
FIG. 3 is a schematic diagram of a cross-section of a coil element, in accordance with aspects of the present disclosure.
Figure 4:
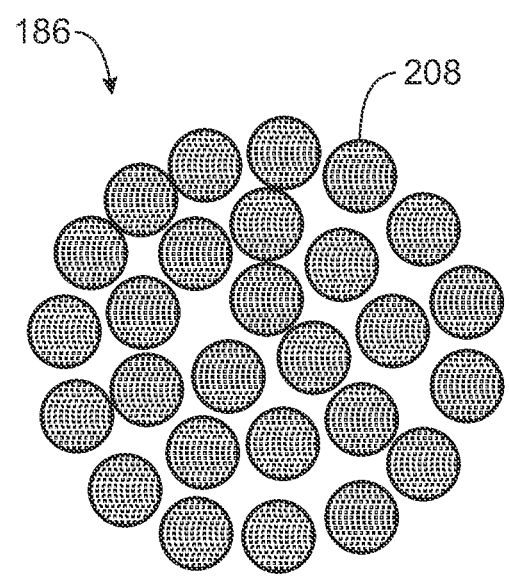
FIG. 4 is a schematic diagram of a cross-section of a coil element (e.g., having a bare conductor), in accordance with aspects of the present disclosure.

Each coil element 186 includes a distributed capacitance construction. In particular, each coil element 186 includes a coaxial conductor having a cross-section configured to generate exact capacitance for element tuning at a specific frequency. For example, as depicted in FIG. 3, a coaxial coil element portion 198 (of the coil element 186) includes a round center conductor wire 200, an outer concentric shield 202, and a dielectric material 204 in between. The center conductor wire 200 may be of copper (e.g., silver plated copper) and the dielectric material 204 may be rubber, plastic, or some other dielectric material (e.g., fluoroethylenepropylene (FEP) or polytetrafluoroethylene (pTFE)). In certain embodiments, the center conductor wire 200 may be a bundle as depicted in FIG. 4. The outer concentric shield 202 may encase or otherwise surround the dielectric material 204 and center conductor wire 200 and may be comprised of braided copper or other suitable conductive material. The center conductor 200, dielectric material 204, and outer shield 202 all share a common central axis 206. Further, while not shown in FIG. 3, in some examples, an outer jacket (e.g., made of dielectric material) may surround the outer shield 202. While two coaxial conductors (center conductor wire 200 and outer shield 202) are shown in FIG. 3, an radio frequency coil element portion may include three or more coaxial conductors, encapsulated and separated from each other by dielectric material. In certain embodiments, the center conductor wire 200 may be made of a liquid metal conductor to enable the coil element 186 to be stretched.

In certain embodiments, as depicted in FIG. 4, the coil element 186 only has a bare conductor 208. In particular, outer covering (e.g., dielectric material or shield) is disposed about the bare conductor 208. In certain embodiments, the bare conductor 208 be Litz wire, wire bundles, tinsel wire bundle, plated filament bundle, woven filament bundle, elasticized thread/filament bundle, or a conductive thread bundle. In particular, the bare conductor 208 may be one or more bundles of conductive fibers. In certain embodiments, the bare conductor 208 may include a plurality of bundles of the conductive fibers twisted or braided in a uniform pattern.

Figure 5:
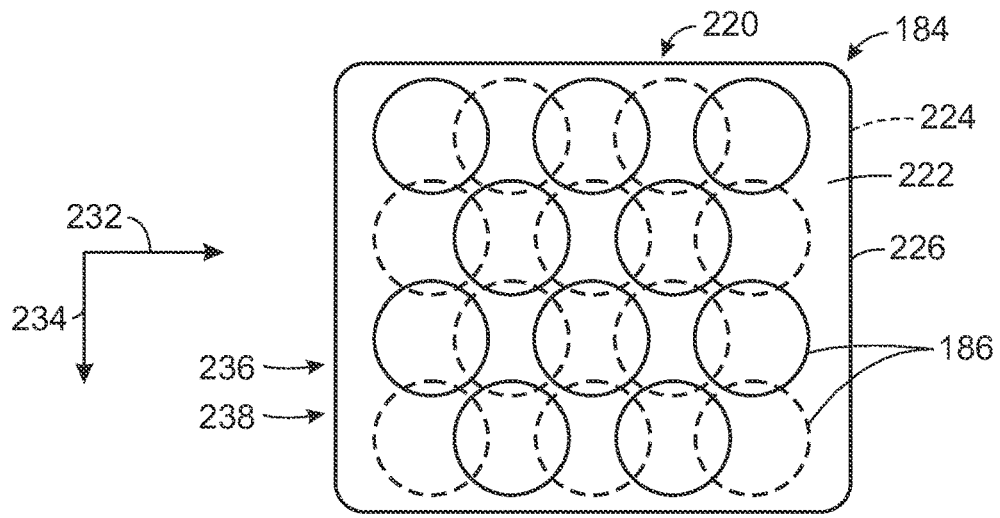
FIG. 5 is a schematic diagram of a coil layout (e.g., for a dual-sided arrangement) for a radio frequency coil, in accordance with aspects of the present disclosure.
Figure 6:
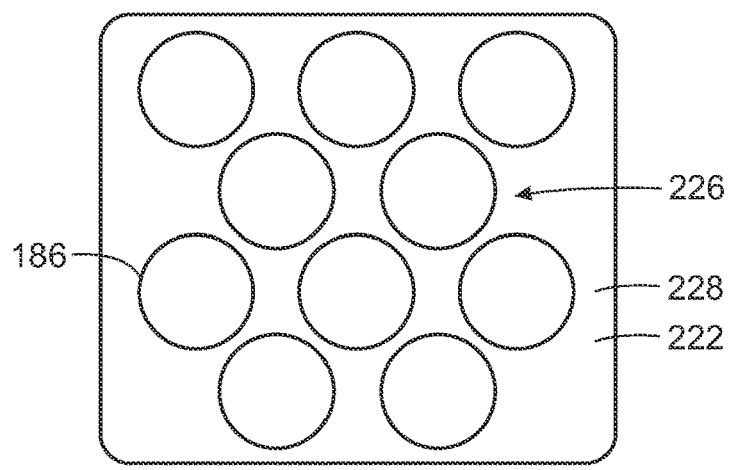
FIG. 6 is a schematic diagram of a first side of the radio frequency coil in FIG. 5, in accordance with aspects of the present disclosure.
Figure 7:
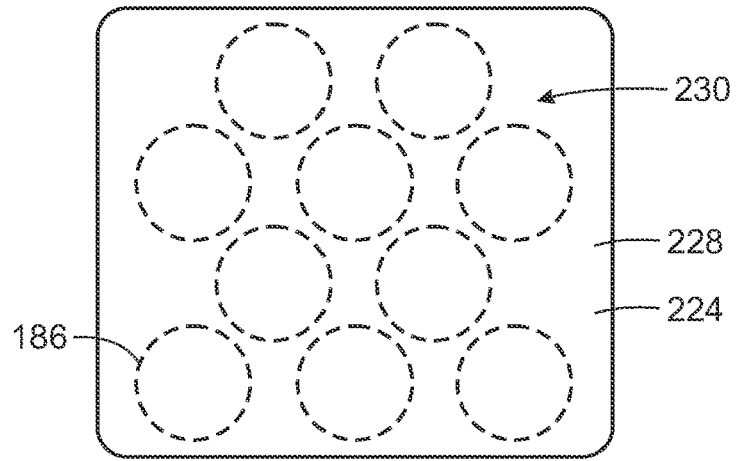
FIG. 7 is a schematic diagram of a second side of the radio frequency coil in FIG. 5, in accordance with aspects of the present disclosure.

FIG. 5 is a schematic diagram of a coil layout 220 (e.g., for a dual-sided arrangement) for the radio frequency coil 184 (of a radio frequency receiving coil assembly). FIGS. 6 and 7 are schematic diagrams of a first side 222 and a second side 224, respectively, of the radio frequency coil 184 in FIG. 5. The radio frequency coil 184 includes a first set 226 of coil elements 186 (e.g., flexible coil elements) coupled on the first side 222 of an anchoring material layer 228 (e.g., flexible anchoring material layer). The radio frequency coil 184 also includes a second set of 230 of coil elements 186 coupled on the second side 224 of the anchoring material layer 228. In certain embodiments, the coil elements 186 may be glued to the anchoring material layer 228. In certain embodiments, the coil elements 186 may be sewed onto the anchoring material layer 228. For example, the conductor of the coil elements 186 may be sewn on the anchoring material layer 228 using a bobbin sewing technique. In certain embodiments, the conductor of the coil elements 186 serves as the bobbin thread and a nonconductive thread (e.g., plastic thread) is utilized as the top thread. In certain embodiments, the conductor of the coil elements 186 serves as the top thread and a nonconductive thread (e.g., plastic thread) is utilized as the bobbin thread. In certain embodiments, the coil elements 186 include bare conductors as described in FIG. 4. In certain embodiments, the coil elements 186 include shielded conductors as described in FIG. 3. The respective electronic units and coil-interfacing cables for each of the coil elements 186 are not shown. In certain embodiments, the anchoring material layer 228 may include slits for the respective electronic units and coil-interfacing cables for one set of coil elements on one side to be disposed on the opposite side of the anchoring material layer 228 so that all of the electronic units and coil-interfacing cables for all of the coil elements (both sets of coil elements) are all disposed on a single side of the anchoring material layer 228 for easier cabling. The anchoring material layer 228 and the first set 226 and the second set 230 of coil elements 186 are disposed within the flexible enclosure (e.g., flexible enclosure 194 in FIG. 2). The number of coil elements 186 in each set 226, 230 may vary. The number of rows and/or columns and arrangement of the coil elements 186 in each set 226, 230 may vary.

In certain embodiments, the flexible anchoring material layer 228 is stretchable. In certain embodiments, the flexible anchoring material layer 228 is made of a heat dissipating material. In certain embodiments, the flexible anchoring material layer 228 is magnetic resonance compatible and does not generate a proton signal. In certain embodiments, the flexible anchoring material layer 228 is made of a film (e.g., plastic film). In certain embodiments, the flexible anchoring material layer 228 is made of a fabric.

As shown in the coil layout 220 in FIG. 5, respective coil elements 186 of both the first set 226 of coil elements 186 and the second set 230 of coil elements 186 are alternately disposed between each other along a first direction 232 and a second direction 234 (which are orthogonal with respect to each other) along a horizontal plane 236 as defined by the anchoring material layer 228. Each coil element 186 of the first set 226 of coil elements 186 overlaps with at least two coil elements 186 of the second set 230 of coil elements 186 (and vice versa) without the respective malleable or stretchable conductors directly contacting each other. In certain embodiments, some coil elements 186 of the first set 226 of coil elements 186 overlap with at three or four coil elements 186 of the second set 230 of coil elements 186 (and vice versa) without the respective malleable or stretchable conductors directly contacting each other. In certain embodiments, where the respective malleable or stretchable conductors are bare malleable or stretchable conductors, the bare malleable or stretchable conductors of the first set 226 of coil elements 186 and the second set 230 of coil elements 186 overlap without directly contacting each other at the points of overlap (thus, avoiding any potential shorts). The dual-sided arrangement enables an optimal number of overlaps between the coil elements 186 of the different sets 226, 230 of coil elements 186.

Figure 8:
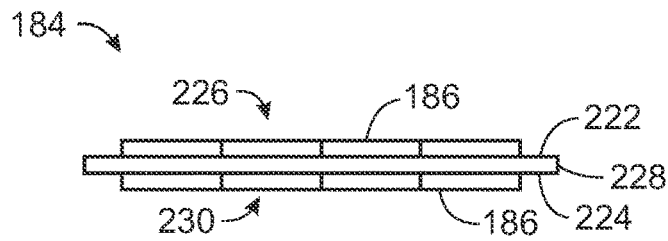
FIG. 8 is an schematic side view of the radio frequency coil in FIG. 5 from a side, in accordance with aspects of the present disclosure.

FIG. 8 is a schematic side view (e.g., from side 238 in FIG. 5) of the radio frequency coil 184 in FIG. 5. The radio frequency coil 184 in FIG. 8 is not to scale. The radio frequency coil 184 is as described in FIGS. 5-7.

Figure 9:
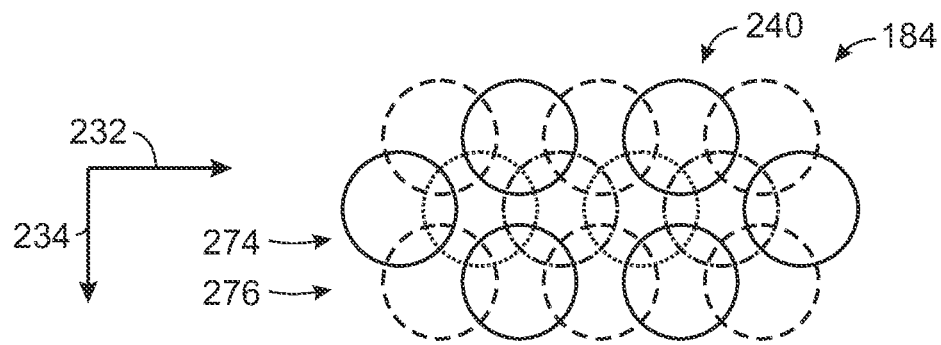
FIG. 9 is a schematic diagram of a coil layout (e.g., for a layered arrangement) for a radio frequency coil, in accordance with aspects of the present disclosure.
Figure 10:
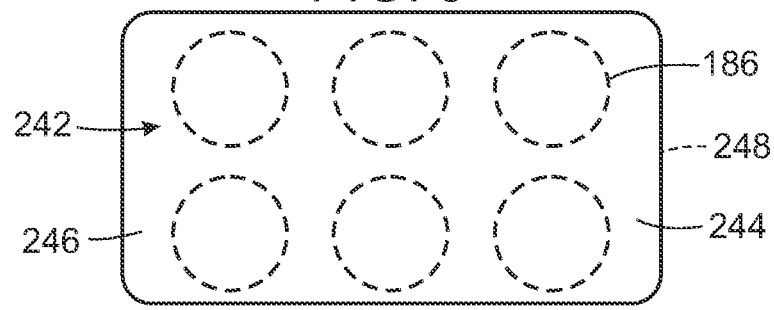
FIG. 10 is a schematic diagram of a first set of coil elements on a first layer for the radio frequency coil in FIG. 9, in accordance with aspects of the present disclosure.
Figure 11:
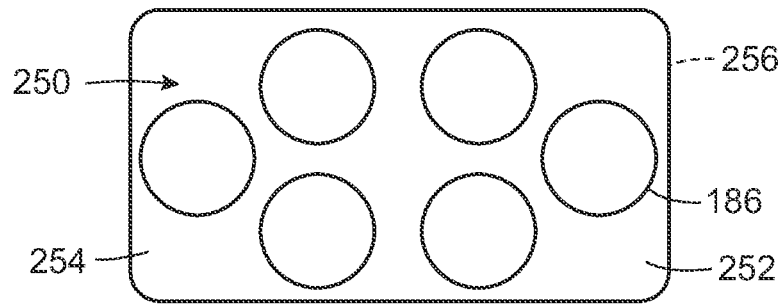
FIG. 11 is a schematic diagram of a second set of coil elements on a second layer for the radio frequency coil in FIG. 9, in accordance with aspects of the present disclosure.
Figure 12:
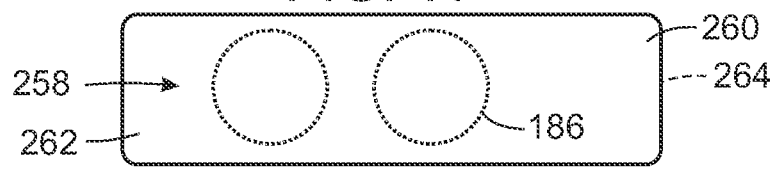
FIG. 12 is a schematic diagram of a third set of coil elements on a third layer for the radio frequency coil in FIG. 9, in accordance with aspects of the present disclosure.
Figure 13:
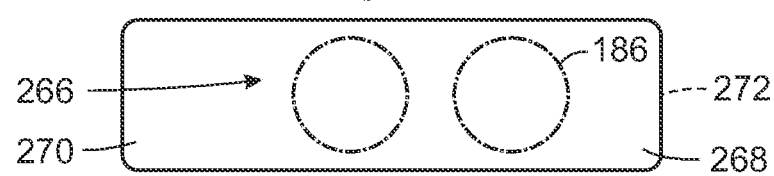
FIG. 13 is a schematic diagram of a fourth set of coil elements on a fourth layer for the radio frequency coil in FIG. 9, in accordance with aspects of the present disclosure.

FIG. 9 is a schematic diagram of a coil layout 240 (e.g., for a layered arrangement) for the radio frequency coil 184 (of a radio frequency receiving coil assembly). FIGS. 10-13 are schematic diagrams of different sets of coil elements 186 on different layers for the radio frequency coil 184 in FIG. 9. The coil layout 240 depicts the arrangement of all of the coil elements 186 on the different layers relative to each other.

The radio frequency coil 184 includes a first set 242 of coil elements 186 (e.g., flexible coil elements) coupled on side 244 of an anchoring material layer 246 (e.g., flexible anchoring material layer) and no coil elements disposed on opposite side 248 of the anchoring material layer 246. The radio frequency coil 184 also includes a second set 250 of coil elements 186 (e.g., flexible coil elements) coupled on side 252 of an anchoring material layer 254 (e.g., flexible anchoring material layer) and no coil elements disposed on opposite side 256 of the anchoring material layer 254. The radio frequency coil 184 further includes a third set 258 of coil elements 186 (e.g., flexible coil elements) coupled on side 260 of an anchoring material layer 262 (e.g., flexible anchoring material layer) and no coil elements disposed on opposite side 264 of the anchoring material layer 262. The radio frequency coil 184 even further includes a fourth set 266 of coil elements 186 (e.g., flexible coil elements) coupled on side 268 of an anchoring material layer 270 (e.g., flexible anchoring material layer) and no coil elements disposed on opposite side 272 of the anchoring material layer 270.

The anchoring material layer 262 is stacked on the anchoring material layer 270 so that the side 268 (and coil elements 186 on the side 268) interface with the side 264 of the anchoring material layer 262. The anchoring material layer 254 is stacked on the anchoring material layer 262 so that the side 260 (and coil elements 186 on the side 260) interface with the side 256 of the anchoring material layer 254. The anchoring material layer 246 is stacked on the anchoring material layer 254 so that the side 252 (and coil elements 186 on the side 252) interface with the side 248 of the anchoring material layer 246.

In certain embodiments, the coil elements 186 may be glued to the respective anchoring material layers 246, 254, 262, and 270. In certain embodiments, the coil elements 186 may be sewed onto the respective anchoring material layers 246, 254, 262, and 270. For example, the conductor of the coil elements 186 may be sewn on the anchoring material layers 246, 254, 262, and 270 using a bobbin sewing technique. In certain embodiments, the conductor of the coil elements 186 serves as the bobbin thread and a nonconductive thread (e.g., plastic thread) is utilized as the top thread. In certain embodiments, the conductor of the coil elements 186 serves as the top thread and a nonconductive thread (e.g., plastic thread) is utilized as the bobbin thread. In certain embodiments, the coil elements 186 include bare conductors as described in FIG. 4. In certain embodiments, the coil elements 186 include shielded conductors as described in FIG. 3. The respective electronic units and coil-interfacing cables for each of the coil elements 186 are not shown. In certain embodiments, some of the anchoring material layers 246, 254, 262, and 270 may include slits for the respective electronic units and coil-interfacing cables for one or more sets of coil elements on one or more of the anchoring material layers 246, 254, 262, and 270 to be disposed on a single side of one of the anchoring material layers 246, 254, 262, and 270 so that all of the electronic units and coil-interfacing cables for all of the coil elements (of all the sets of coil elements) are all disposed on the single side of only one of the anchoring material layers 246, 254, 262, and 270 for easier cabling. The anchoring material layers 246, 254, 262, and 270 and the sets 242, 250, 258, and 266 of coil elements 186 are disposed within the flexible enclosure (e.g., flexible enclosure 194 in FIG. 2). The number of coil elements 186 in each set 242, 250, 258, and 266 may vary. The number of rows and/or columns and arrangement of the coil elements 186 in each set 242, 250, 258, and 266 may vary. Both the number of sets of coil elements 186 and the corresponding number of anchoring material layers may vary.

In certain embodiments, one or more of the flexible anchoring material layers 246, 254, 262, and 270 is stretchable. In certain embodiments, one or more of the flexible anchoring material layers 246, 254, 262, and 270 are made of a heat dissipating material. In certain embodiments, one or more of the flexible anchoring material layers 246, 254, 262, and 270 are magnetic resonance compatible and do not generate a proton signal. In certain embodiments, one or more of the flexible anchoring material layers 246, 254, 262, and 270 are made of a film (e.g., plastic film). In certain embodiments, one or more of the flexible anchoring material layers 246, 254, 262, and 270 are made of a fabric.

As shown in the coil layout 240 in FIG. 9, respective coil elements 186 of the different sets 242, 250, 258, and 266 of coil elements 186 are alternately disposed between each other along the first direction 232 and the second direction 234 (which are orthogonal with respect to each other) along a horizontal plane 274 as defined by the stacked anchoring material layers 246, 254, 262, and 270. At least one coil element 186 of each set 242, 250, 258, and 266 of coil elements 186 overlaps with at least one coil element 186 of two or more of the other sets 242, 250, 258, 266 of coil elements 186 without the respective malleable or stretchable conductors directly contacting each other. In certain embodiments, where the respective malleable or stretchable conductors are bare malleable or stretchable conductors, the bare malleable or stretchable conductors of the overlapping coil elements 186 overlap without directly contacting each other at the points of overlap (thus, avoiding any potential shorts). The layered arrangement enables an optimal number of overlaps between the coil elements 186 of the different sets 242, 250, 258, 266 of coil elements 186.

Figure 14:
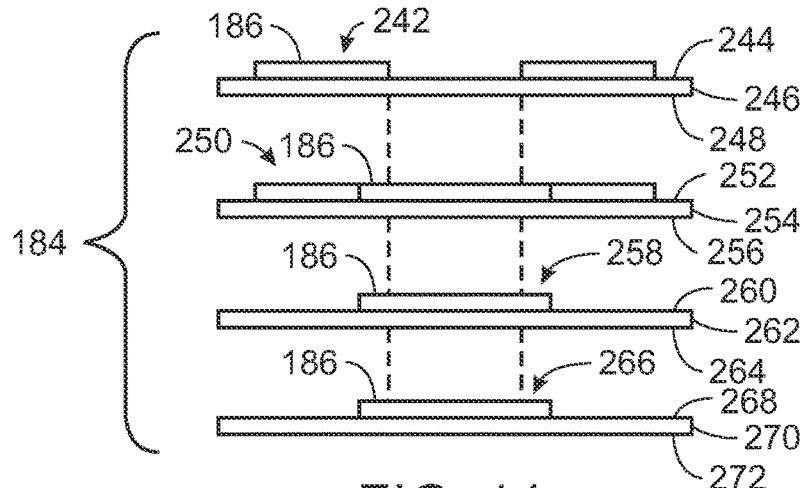
FIG. 14 is an exploded view of the radio frequency coil in FIG. 9 from a side, in accordance with aspects of the present disclosure.

FIG. 14 is an exploded view of the radio frequency coil 184 in FIG. 9 from a side (e.g., side 276 in FIG. 9). The radio frequency coil 184 in FIG. 14 is not to scale. The radio frequency coil 184 is as described in FIGS. 9-13.

Figure 15:
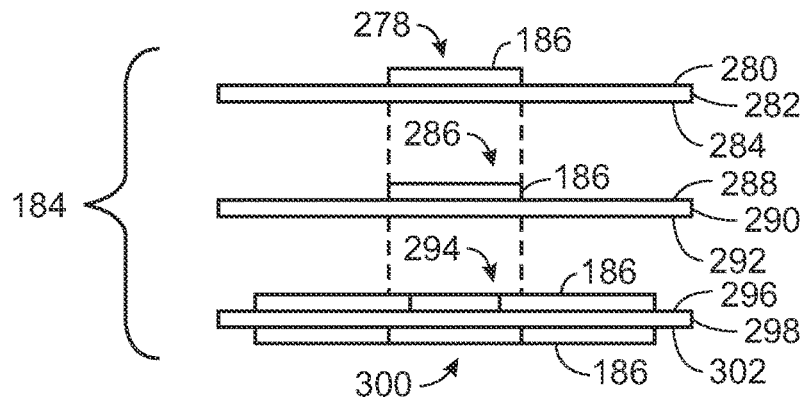
FIG. 15 is an exploded view of a radio frequency coil from a side (with both dual-sided and layered arrangements), in accordance with aspects of the present disclosure.

FIG. 15 is an exploded view of the radio frequency coil 184 from a side (with both dual-sided and layered arrangements). The radio frequency coil 184 includes a set 278 of coil elements 186 (e.g., flexible coil elements) coupled on side 280 of an anchoring material layer 282 (e.g., flexible anchoring material layer) and no coil elements disposed on opposite side 284 of the anchoring material layer 282. The radio frequency coil 184 also includes a set 286 of coil elements 186 (e.g., flexible coil elements) coupled on side 288 of an anchoring material layer 290 (e.g., flexible anchoring material layer) and no coil elements disposed on opposite side 292 of the anchoring material layer 290. Only a single coil element is shown for each of the sets 278, 286 of coil elements 186. The radio frequency coil 184 further includes a set 294 of coil elements 186 coupled on side 296 of an anchoring material layer 298 and a set 300 of coil elements 186 coupled on opposite side 302 of the anchoring material layer 298.

The anchoring material layers 282, 290, and 298 and their respective coil elements 186 are arranged in a stacked arrangement and disposed within a flexible enclosure (e.g., flexible enclosure 192 in FIG. 2). For example, anchoring material layer 282 is stacked on anchoring material layer 290 so that that the side 288 interfaces with the side 284. Also, the anchoring material layers 282 and 290 are stacked on the anchoring material layer 298 so that side 296 interfaces with the side 292. At least one coil element of each of the sets 278, 286 294, and 300 of coil elements 186 overlaps with one or more coil elements 186 of one or more of the other sets 278, 286, 294, and 300 of coil elements 186 without the respective malleable or stretchable conductors directly contacting each other. In certain embodiments, where the respective malleable conductors are bare malleable or stretchable conductors, the bare malleable or stretchable conductors overlap without directly contacting each other at the points of overlap (thus, avoiding any potential shorts).

Figure 16:
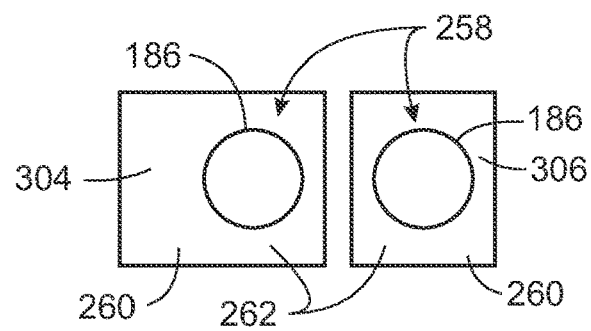
FIG. 16 is a schematic diagram of a third set of coil elements on a third layer for the radio frequency coil in FIG. 9 (e.g., with the third layer made of multiple separate pieces), in accordance with aspects of the present disclosure.

It should be noted that in the stacked arrangement for the RF coil 184 in FIG. 9 or a combination of the stacked arrangement and dual-sided arrangement for the RF coil 184 in FIG. 15, a patchwork approach may be utilized in stacking of one or more layers. In particular, a set of coil elements for a given layer may be divided between two or more separate pieces of the anchoring material to form a single anchoring material layer having the set of coil elements. Each separate piece of anchoring material may have one or more coil elements of a given set of coil elements while the rest of the coil elements are distributed on the remaining pieces of anchoring material that form the single anchoring material layer. For example, FIG. 16 depicts the third layer (in FIG. 12) of the RF coil in FIG. 9 but with the third layer divided into multiple pieces. In particular, the anchoring material layer 262 is divided into pieces 304 and 306 that together form the third layer. As depicted in FIG. 16, a single coil element 186 is disposed on the side 260 of the pieces 304 and 306 to form the set of 258 of coil elements 186. The pieces 304 and 306 may then be disposed on the fourth layer (in FIG. 13) of the RF coil 184 in FIG. 9. The patchwork approach reduces the amount of material (e.g., anchoring material) utilized in the overall array construction.

Figure 17:
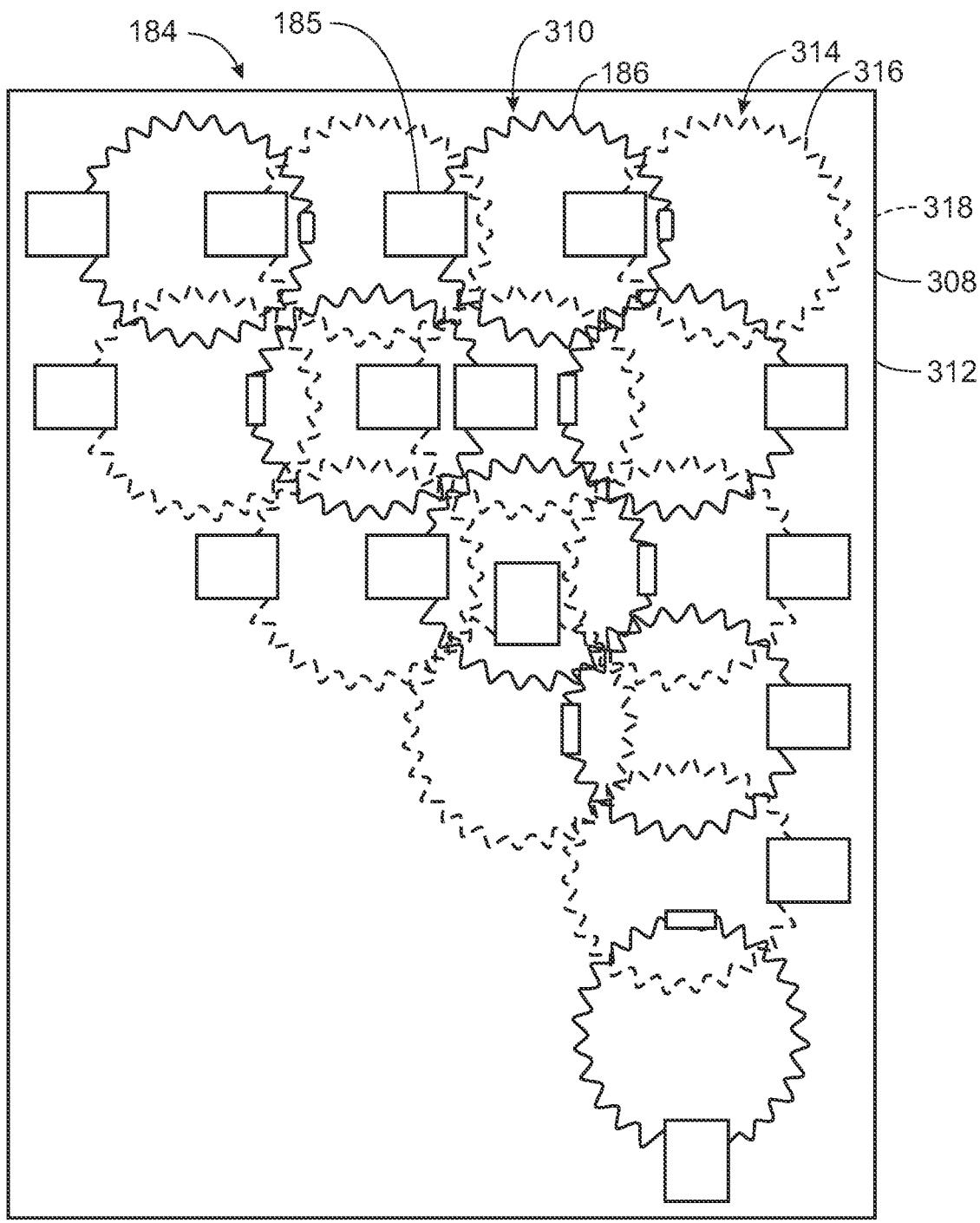
FIG. 17 is a schematic diagram of an RF coil with the coil elements sewn on an anchoring material layer, in accordance with aspects of the present disclosure.

FIG. 17 is a schematic diagram of the RF coil 184 with the coil elements 186 sewn on an anchoring material layer 308. The RF coil 184 is assembled in a dual-sided arrangement. A first set 310 of coil elements 186 are sewn on a side 312 of the anchoring material layer 308 and a second set 314 of coil elements 186 (as indicated by outline of top stitch 316 (e.g., nonconductive thread) are sewn on opposite side 318 of the anchoring material layer 308. As depicted, the coil elements 186 meander (e.g., zig-zag). This enables the coil elements 86 to stretch on the anchoring material layer 308. Also, as depicted, the electronics units 185 are all disposed on the side 312. The anchoring material layer 308 includes slits (not shown) to enable the electronic units 185 associated with the second set 314 of coil elements 186 to be disposed on the side 312 of the anchoring material layer 308. In certain embodiments, the coil elements 186 may have a capacitive break (e.g., as indicated by the smaller/narrower rectangles depicted in FIG. 17). In certain embodiments, the coil elements 186 may be continuous and connected to the electronic unit 185.

Technical effects of the disclosed subject matter include enabling the utilization of conductors (e.g., bare conductors) without a conductive shield or covering. Technical effects of the disclosed subject matter also include enabling the overlap of bare conductors without touching each other at points of overlap, thus, avoiding any potential shorts. Technical effects of the disclosed subject matter further include expanding the number of techniques that may be utilized in construction of the coil. Technical effects of the disclosed subject matter even further include enabling for a coil assembly that is both lighter and more flexible, thus, enhancing patient comfort as well enabling easier positioning of the coil assembly. Technical effects of the disclosed subject matter still further include enabling for the manufacturing of coil in a simpler manner (and thus quicker manner) and at reduced cost.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more coil elements designated as "means for [perform]ing [a function] . . . " or "step for [perform]ing [a function] . . . ", it is intended that such coil elements are to be interpreted under 35 U.S.C. 112(f). However, for any claims containing coil elements designated in any other manner, it is intended that such coil elements are not to be interpreted under 35 U.S.C. 112(f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural coil elements that do not differ from the literal language of the claims, or if they include equivalent structural coil elements with insubstantial differences from the literal languages of the claims.

The invention claimed is:

1. A radio frequency receiving coil assembly for a magnetic resonance imaging system, comprising:
    a flexible enclosure;
    a flexible anchoring material layer disposed within the flexible enclosure;
    a radio frequency coil disposed within the flexible enclosure, wherein the radio frequency coil comprises a plurality of flexible coil elements having a bare malleable or stretchable conductor, wherein the plurality of flexible coil elements comprises a first set of flexible coil elements and a second set of flexible coil elements, wherein at least one flexible coil element of the first set of flexible coil elements overlaps with at least one flexible coil element of the second set of flexible coil elements without respective bare malleable or stretchable conductors directly contacting each other, wherein the first set of flexible coil elements is disposed on a first side of the flexible anchoring material layer and the second set of flexible coil elements is disposed on a second side of the flexible anchoring material layer opposite the first side, and the flexible anchoring material layer is a fabric, and wherein the plurality of flexible coil elements each comprise a structurally similar loop.

2. The radio frequency receiving coil assembly of claim 1, wherein each flexible coil element of the first set of flexible coil elements overlaps with at least two flexible coil elements of the second set of flexible coil elements without the respective bare malleable or stretchable conductors directly contacting each other.

3. The radio frequency receiving coil assembly of claim 1, further comprising a first flexible anchoring material layer having a first side and a second side opposite the first side, and a second flexible anchoring material layer having a third side and a fourth side opposite the third side, wherein the first set of flexible coil elements is disposed on the first side of the first flexible anchoring material layer and the second set of flexible coil elements is disposed on the third side of the second flexible anchoring material layer, and the first flexible anchoring material layer is disposed over the second flexible anchoring material layer within the flexible enclosure in a stacked arrangement so that the third side of the second flexible anchoring material layer interfaces with the second side of the first flexible anchoring material layer.

4. The radio frequency receiving coil assembly of claim 3, further comprising a third flexible anchoring material layer, wherein the plurality of flexible coil elements comprises a third set of flexible coil elements and a fourth set of flexible coil elements, wherein the third set of flexible coil elements is disposed on a fifth side of the flexible anchoring material layer and the fourth set of flexible coil elements is disposed on a sixth side of the flexible anchoring material layer opposite the fifth side, both the first flexible anchoring material layer and the second anchoring material layer are disposed over the third anchoring material layer within the flexible enclosure in the stacked arrangement so that the fifth side of the third flexible anchoring material layer interfaces with the fourth side of the second flexible anchoring material layer, and at least one flexible coil element of the third set of flexible coil elements overlaps with at least one flexible coil element of the fourth set of flexible coil elements without the respective bare malleable or stretchable conductors directly contacting each other.

5. The radio frequency receiving coil assembly of claim 4, wherein at least one flexible coil element of both the third set of flexible coil elements and fourth set of flexible coil elements overlaps with at least one flexible coil element of both the first set of flexible coil elements and the second set of flexible coil elements without the respective bare malleable or stretchable conductors directly contacting each other.

6. The radio frequency receiving coil assembly of claim 3, further comprising a third flexible anchoring material layer having a fifth side and a sixth side opposite the fifth side, wherein the plurality of flexible coil element comprises a third set of flexible coil elements, wherein the third set of flexible coil elements is disposed on the fifth side of the third flexible anchoring material layer, the third flexible anchoring material layer is disposed over the first flexible anchoring material layer within the flexible enclosure in the stacked arrangement so that the first side of the first flexible anchoring material layer interfaces with the sixth side of the third flexible anchoring material layer, and at least one flexible coil element of the third set of flexible coil elements overlaps with at least one flexible coil element of both the first set of flexible coil elements and the second set of flexible coil elements without the respective bare malleable or stretchable conductors contacting each other.

7. The radio frequency receiving coil assembly of claim 6, further comprising a fourth flexible anchoring material layer having a seventh side and a eighth side opposite the seventh side, wherein the plurality of flexible coil element comprises a fourth set of flexible coil elements, wherein the fourth set of flexible coil elements is disposed on the seventh side of the fourth flexible anchoring material layer, the fourth flexible anchoring material layer is disposed over the third flexible anchoring material layer within the flexible enclosure in the stacked arrangement so that the fifth side of the third flexible anchoring material layer interfaces with the eighth side of the fourth flexible anchoring material layer, and at least one flexible coil element of the fourth set of flexible coil elements overlaps with at least one flexible coil element of each of the first set of flexible coil elements, the second set of flexible coil elements, and the third set of flexible coil elements without the respective bare malleable or stretchable conductors contacting each other.

8. The radio frequency receiving coil assembly of claim 3, wherein the both the first flexible anchoring material layer and the second flexible anchoring material layer are stretchable.

9. The radio frequency receiving coil assembly of claim 1, wherein the bare malleable or stretchable conductor of each flexible coil element of the plurality of flexible coil elements comprises Litz wire, wire bundles, tinsel wire bundle, plated filament bundle, woven filament bundle, or a conductive thread bundle.

10. The radio frequency receiving coil assembly of claim 1, wherein the radio frequency coil comprises a single-tuned coil.

11. The radio frequency receiving coil assembly of claim 1, comprises a multi-tuned coil, wherein the first set of flexible coils is tuned to a first frequency, and the second set of flexible coil is tuned to a second frequency different from the first frequency.

12. The radio frequency receiving coil assembly of claim 1, wherein both the first set of flexible coil elements and the second set of flexible coil elements are sewn on the flexible anchoring material layer.

13. A radio frequency receiving coil assembly for a magnetic resonance imaging system, comprising:
   a flexible enclosure;
   a flexible anchoring material layer disposed within the flexible enclosure; and
   a radio frequency coil disposed within the flexible enclosure, wherein the radio frequency coil comprises a plurality of flexible coil elements having a malleable or stretchable conductor, wherein the plurality of flexible coil elements comprises a first set of flexible coil elements and a second set of flexible coil elements, wherein the first set of flexible coil elements is sewn on a first side of the flexible anchoring material layer and the second set of flexible coil elements is sewn on a second side of the flexible anchoring material layer opposite the first side, and wherein at least one flexible coil element of the first set of flexible coil elements overlaps with at least one flexible coil element of the second set of flexible coil elements, wherein the plurality of flexible coil elements each comprise a structurally similar loop.

14. The radio frequency receiving coil assembly of claim 13, wherein the malleable or stretchable conductor of each flexible coil element of the plurality of flexible coil elements is a bare malleable or stretchable conductor, and the at least one flexible coil element of the first set of flexible coil elements overlaps with the at least one flexible coil element of the second set of flexible coil elements without respective bare malleable or stretchable conductors directly contacting each other.

15. The radio frequency receiving coil assembly of claim 13, wherein the flexible anchoring material layer is a fabric.

16. A radio frequency receiving coil assembly for a magnetic resonance imaging system, comprising:
   a flexible enclosure;
   a first flexible anchoring material layer disposed within the flexible enclosure and having a first side and a second side;
   a second flexible anchoring material layer disposed within the flexible enclosure having a third side and a fourth side;
   and
   a radio frequency coil disposed within the flexible enclosure, wherein the radio frequency coil comprises a plurality of flexible coil elements having a malleable or stretchable conductor, wherein the plurality of flexible coil elements comprises a first set of flexible coil elements and a second set of flexible coil elements, wherein the first set of flexible coil elements is disposed on the first side of the first flexible anchoring material layer and the second set of flexible coil elements is disposed on the third side of the second flexible anchoring material layer, the first flexible anchoring material layer is disposed over the second flexible anchoring material layer within the flexible enclosure in a stacked arrangement so that the third side of the second flexible anchoring material layer interfaces with the second side of the first flexible anchoring material layer, and wherein at least one flexible coil element of the first set of flexible coil elements overlaps with at least one flexible coil element of the second set of flexible coil elements.

17. The radio frequency receiving coil assembly of claim 16, wherein the malleable or stretchable conductor of each flexible coil element of the plurality of flexible coil elements is a bare malleable or stretchable conductor, and the at least one flexible coil element of the first set of flexible coil elements overlaps with the at least one flexible coil element of the second set of flexible coil elements without respective bare malleable or stretchable conductors directly contacting each other.

18. The radio frequency receiving coil assembly of claim 16, further comprising a third flexible anchoring material layer having a fifth side and a sixth side opposite the fifth side, wherein the plurality of flexible coil element comprises a third set of flexible coil elements, wherein the third set of flexible coil elements is disposed on the fifth side of the third flexible anchoring material layer, the third flexible anchoring material layer is disposed over the first flexible anchoring material layer within the flexible enclosure in the stacked arrangement so that the first side of the first flexible anchoring material layer interfaces with the sixth side of the third flexible anchoring material layer, and at least one flexible coil element of the third set of flexible coil elements overlaps with at least one flexible coil element of both the first set of flexible coil elements and the second set of flexible coil elements.

19. The radio frequency receiving coil assembly of claim 18, further comprising a fourth flexible anchoring material layer having a seventh side and a eighth side opposite the seventh side, wherein the plurality of flexible coil element comprises a fourth set of flexible coil elements, wherein the fourth set of flexible coil elements is disposed on the seventh side of the fourth flexible anchoring material layer, the fourth flexible anchoring material layer is disposed over the third flexible anchoring material layer within the flexible enclosure in the stacked arrangement so that the fifth side of the third flexible anchoring material layer interfaces with the eighth side of the fourth flexible anchoring material layer, and at least one flexible coil element of the fourth set of flexible coil elements overlaps with at least one flexible coil element of each of the first set of flexible coil elements, the second set of flexible coil elements, and the third set of flexible coil elements.

20. The radio frequency receiving coil assembly of claim 16, further comprising a third flexible anchoring material layer having a fifth side and a sixth side opposite the fifth side, wherein the plurality of flexible coil element comprises a third set of flexible coil elements, wherein the third set of flexible coil elements is disposed on the fifth side of the third flexible anchoring material layer, the third flexible anchoring material layer is disposed over the first flexible anchoring material layer within the flexible enclosure in the stacked arrangement so that the first side of the first flexible anchoring material layer interfaces with the sixth side of the third flexible anchoring material layer, and at least one flexible coil element of the third set of flexible coil elements overlaps with at least one flexible coil element of both the first set of flexible coil elements and the second set of flexible coil elements without the respective bare malleable or stretchable conductors contacting each other, and wherein at least one flexible coil element of both the third set of flexible coil elements and fourth set of flexible coil elements overlaps with at least one flexible coil element of both the first set of flexible coil elements and the second set of flexible coil elements without the respective bare malleable or stretchable conductors directly contacting each other.

* * * * *